April 18, 1950
J. CARLSON
2,504,801
HANDLE FOR FISHING RODS
Filed Oct. 23, 1947
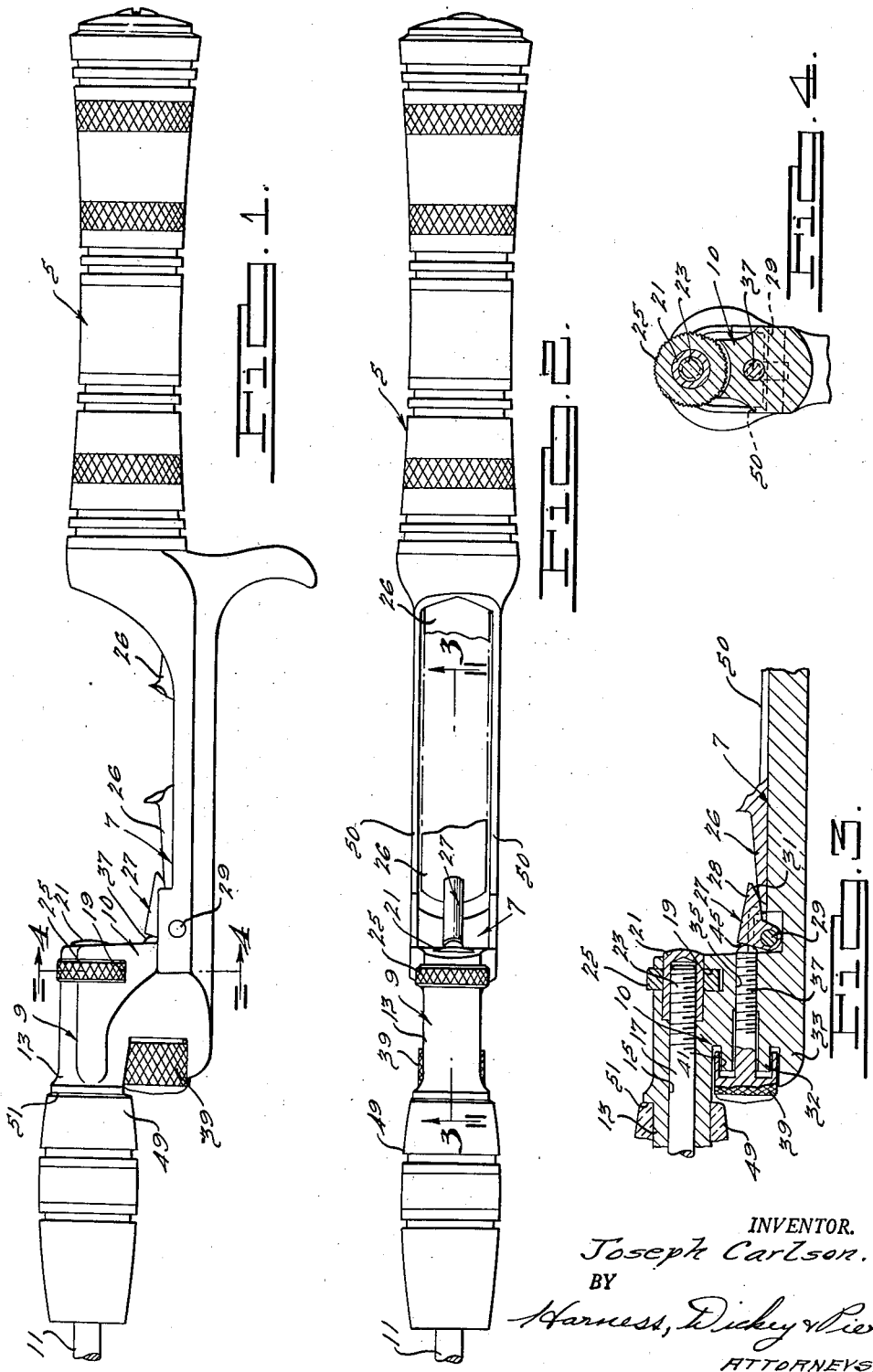
INVENTOR.
Joseph Carlson.
BY
Harness, Dickey & Pierce
ATTORNEYS.

Patented Apr. 18, 1950

2,504,801

UNITED STATES PATENT OFFICE 2,504,801

HANDLE FOR FISHING RODS

Joseph Carlson, Romeo, Mich.; Marie E. H. W. Carlson executrix of estate of said Joseph Carlson, deceased Application October 23, 1947, Serial No. 781,736

1 Claim. (Cl. 43—22)

The present invention relates to a fishing rod handle having improved means for detachably securing a removable reel thereto.

A general object of the present invention is to provide an improved mechanism for detachably clamping the base portion of a fishing reel to a handle, which mechanism permits a reel to be quickly and easily attached or detached from a handle and which mechanism is rugged in construction, inexpensive to manufacture and extremely simple, and is so connected to a handle that it may not be accidentally disengaged therefrom and thereby become lost.

Other objects and advantages will become apparent from the following specification, the accompanying drawing and the appended claim.

In the drawing:

Figure 1 is a side elevational view of the improved handle showing a portion of a fishing rod mounted therein;

Fig. 2 is a plan view of the construction illustrated in Fig. 1;

Fig. 3 is a fragmentary section taken along the line 3—3 of Fig. 2; and

Fig. 4 is a sectional view of the structure illustrated in Fig. 1 taken along the line 4—4 thereof.

Referring now to the drawing, the handle of the present invention is similar in certain aspects to the handle illustrated and described in my copending application for Letters Patent Serial No. 640,041, filed January 9, 1946, now Patent No. 2,433,197, December 23, 1947; and comprises three main portions, namely, a main grip 5, which may be made of any suitable material such as plastic or compressed cork; an intermediate portion forming an offset reel seat 7; and a front portion forming a rod socket 9 adapted to receive the butt end of a rod indicated at 11. The entire handle of the construction including the shank portion (not shown) which projects within the main grip 5 is preferably formed as a single integral casting. The reel seat 7 is downwardly offset with respect to the rod socket 9 and is connected to the latter by means of an offset front portion 10.

The rod socket 9 comprises a generally tubular projection 13, the rearward portion of which is integrally connected to the reel seat 7 through the offset portion 10. The tubular portion 13 is provided with an axial bore 15 which is a straight cylindrical hole drilled entirely through the tubular projection, and is of the proper diameter to fit the cylindrical butt end 17 of the rod 11. The rear portion of the tubular projection 13 is provided with a transverse slot 19 which extends entirely across the projection from one side to the other, intersecting the bore 15, and which is located in close proximity to the rear end of the bore. An internally threaded sleeve 21 fits freely within the rear portion of the bore 15 and is adapted to be threaded on a threaded stem 23 which is integral with the butt end 17 of the rod 11. A thumb wheel 25 is securely press fitted about the sleeve 21 and lies within the transverse slot 19, thus serving to hold the sleeve 21 against axial movement within the bore 15. The diameter of the thumb wheel 25 is slightly in excess of the diameter of the cylindrical portion 13 with the result that the knurl periphery of the wheel may be grasped and rotated in order to thread the sleeve 21 on the stem 23 or vice versa. Thus, by turning the thumb wheel 25, the butt end of the rod 11 can be clamped to, or released from, the handle.

The present invention relates particularly to means associated with the reel seat 7 and the offset portion 10 for detachably connecting the base portion 26 of a reel (not shown) to the handle. As best shown in Fig. 3, a lever or finger 27 is pivotally connected to the intermediate portion of the handle, forwardly of the reel seat 7, by means of a pin 29. The lever 27 includes a rearwardly projecting nose portion 28 which overhangs the front end of the reel seat 7 and is adapted to move toward and away from the reel seat 7 in a plane perpendicular thereto. The free end of the nose portion 28 is beveled on its underside at 31 so that the forward end of the reel base 26 may be inserted thereunder in a relatively easy manner, as will hereinafter appear.

The offset handle portion 10 is formed with a forwardly projecting cylindrical boss 32, spaced between the handle tubular portion 13 and a forwardly projecting bottom lip 33. The offset portion 10 and the boss 32 are provided with an axial internally threaded aperture 35, extending entirely therethrough and disposed substantially below the rod socket bore 15. A screw 37, having a knurled head 39, is threaded rearwardly into the aperture 35. The knurled screw head 39 is recessed at 41 so as to encompass the boss 32 when the screw is threaded into the handle offset portion. The shank end of the screw 37, when the latter is threaded rearwardly in the handle, is adapted to abut the back face 45 of the pivoted lever 27, adjacent the upper end thereof, so as to pivot the lever nose portion 28 downwardly and detachably clamp the reel base 26 on the handle reel seat 7. When the screw 37 is backed off by means of the screw head 39, the pivoted lever 27 is free to pivot in a counterclockwise direction and the reel base 26 can be lifted from the reel seat by pivoting the nose portion 28, upwardly, out of the way.

After the screw 37 is assembled into position, a tubular front grip 49 is fitted on the tubular portion 13 of the rod socket 9, and is fixed thereto in any desired manner, either by a press fit or by cementing it in place. The rear face of the grip member 49 abuts a shoulder 51 formed on the tubular portion 13 and overhangs a portion of the knurled screw head 39, forwardly of the latter, so as not to interfere with the operation of the screw but so as to prevent undue backing off of the same. Preferably, the grip member 49 prevents the screw from backing off beyond the point where the rear end of the screw shank reenters the aperture 35.

In order to clamp the reel base 26 in the handle reel seat portion 7, the forward end of the reel base is inserted underneath the overhanging nose portion 28 of the pivoted lever 27 and the reel base seated on the reel seat. The beveled end 31 of the lever nose portion 28 permits this to be easily accomplished. The reel base is then slid rearwardly on the reel seat until it engages a customary notch in the back wall of the latter. The lever nose portion 28 still overhangs the reel base 26 and in order to clamp the latter in place the screw 37 is tightened by turning the knurled head 39 and feeding the screw rearwardly until it abuts the lever and clamps the overhanging nose portion 28 down tightly on the front end of the reel base 26. The reel base is then clamped to the reel seat between the conventional raised side flanges 50 and hence cannot move relative to the seat until the screw 37 is backed off away from the pivoted lever 27. When the latter is accomplished, the reel base can be removed from the handle by merely lifting it up above the flanges 50, and swinging the front end of the reel base laterally away from lever 27. As approximately only one or two turns of the screw 37 will clamp or release the reel base 26 on the reel seat 7, the front grip member 49 will not interfere with the operation of the screw 37 but will prevent the screw from being unthreaded from the handle and lost.

It will thus be seen that the handle of this invention employs a mechanism which will permit a fishing reel to be easily attached to or detached from the handle, and provides a neat appearing handle of a rugged construction having no detachable or projecting parts which may become lost or catch on a fisherman's clothing.

I claim:

A fishing rod handle comprising a front portion forming a rod socket, a portion rearwardly disposed and offset with respect to the front portion and forming a reel seat, a lever pivotally connected to said reel seat portion and having a portion thereof overhanging a portion of said reel seat, a headed screw threadably connected in the offset portion of said handle between said socket and reel seat portions and extending rearwardly into contact with said pivoted lever on an axis parallel to and offset from said rod socket so that said lever may be swung into reel clamping position by adjusting said headed screw, and a front grip member fitted over and fixed to a portion of said rod socket forwardly of the screw head and forming a limit stop for the head of the screw to retain the screw against complete disengagement from said handle.

JOSEPH CARLSON.

REFERENCES CITED

The following references are of record in the file of this patent:

UNITED STATES PATENTS

| Number | Name | Date |
|---|---|---|
| 1,898,323 | Teetor | Feb. 21, 1933 |
| 1,920,966 | Carlson | Aug. 8, 1933 |
| 2,379,578 | Heddon | July 3, 1945 |
| 2,421,240 | Camburn | May 27, 1947 |